Aug. 31, 1965 J. S. KARL 3,203,605
LUGGAGE RACK
Filed Aug. 28, 1963 2 Sheets-Sheet 1
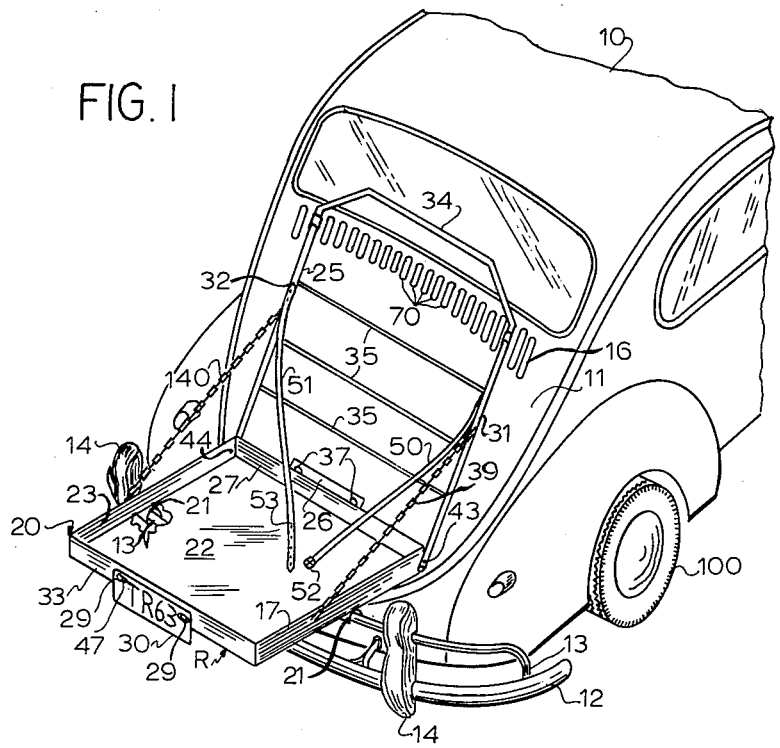
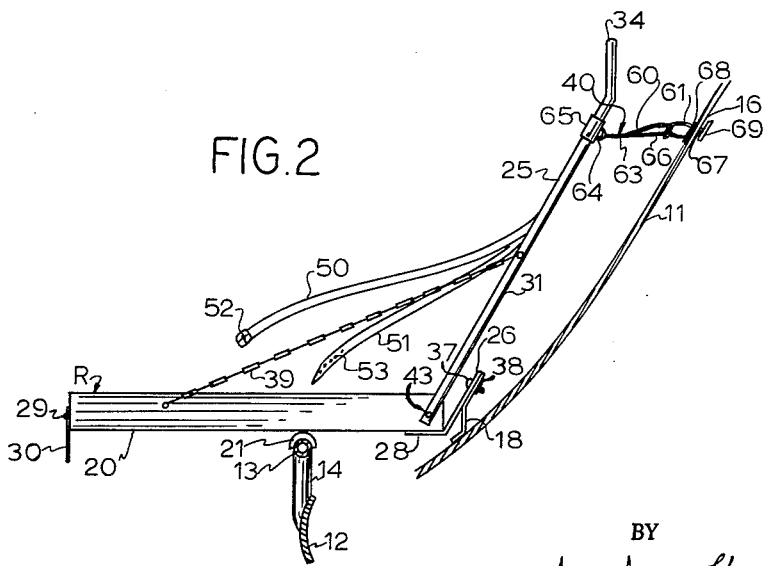
INVENTOR.
JOSEF S. KARL
BY
Newton, Hopkins & Jones
ATTORNEYS Aug. 31, 1965   J. S. KARL   3,203,605
LUGGAGE RACK
Filed Aug. 28, 1963   2 Sheets-Sheet 2
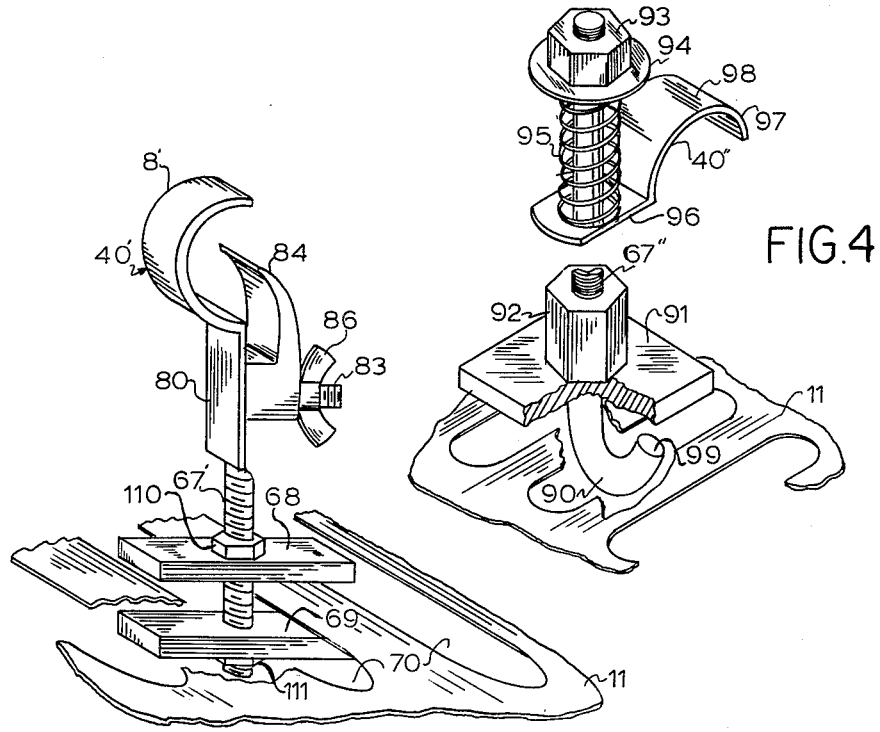
FIG.4
FIG.3
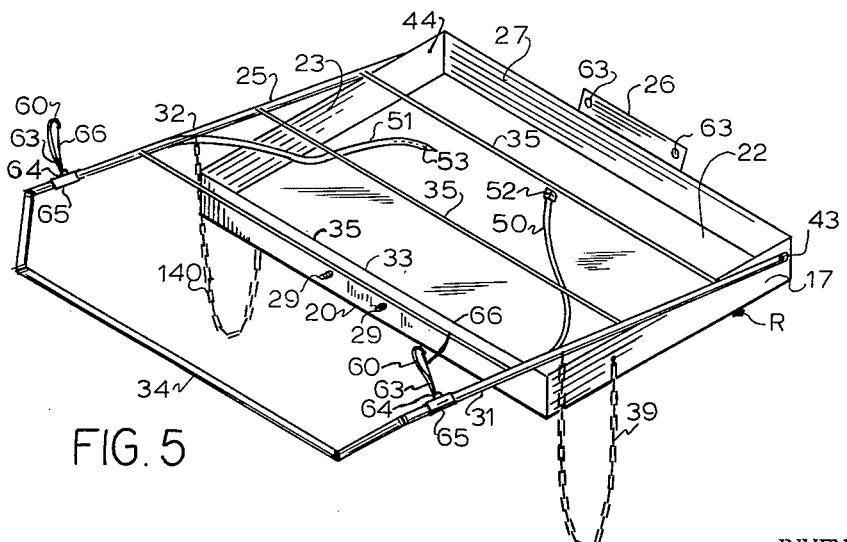
FIG.5
INVENTOR.
JOSEF S. KARL
BY
Newton, Hopkins & Jones
ATTORNEYS

United States Patent Office 3,203,605
Patented Aug. 31, 1965

3,203,605
LUGGAGE RACK
Josef S. Karl, 665 Holman Ave., Athens, Ga.
Filed Aug. 28, 1963, Ser. No. 305,141
1 Claim. (Cl. 224—42.07)

This invention relates to luggage racks, and is more particularly concerned with a luggage rack for an automobile.

Extra space in or on automobiles is often required for carrying excess luggage or relatively large items such as golf carts or golf bags which do not fit conveniently into the luggage space customarily provided. This requirement is most frequently found with respect to the increasingly popular small or compact cars which have both limited interior space and limited luggage space. As a result, numerous attempts have previously been made to provide a luggage rack suitable for carrying extra luggage or relatively large items.

However, the previous luggage racks resulting from these attempts have generally been suited only to carrying rather compact items such as boxes and suitcases. Thus, they have not provided a convenient means for carrying relatively large, clumsy items such as golf bags or golf carts. Moreover, some of those previous luggage racks have required permanent installation on the automobile. Permanent installation is relatively expensive and results in the appearance of the automobile being altered even when the luggage rack is not needed. In addition, when a permanently installed luggage rack is removed from an automobile, it leaves significant mars and scars in the exterior of the automobile.

Those previous luggage racks which have attempted to avoid these problems with permanent installation by providing for temporary installation have generally been unattractive. Moreover, their temporary installation and removal has been relatively time-consuming and they often have not provided adequate support for luggage or other items.

The device of the present invention overcomes these and other problems with previous luggage racks. It is a luggage rack which is quickly mounted on and removed from an automobile and which, although adapted for quick temporary installation, is attractive and provides safe support for even relatively large items when mounted on the automobile. The device is also suited to carrying compact items such as boxes and suitcases and its installation will not mar or permanently alter the appearance of the automobile. Although the device of the invention is suited to use on automobiles of all sizes, it is particularly suited to installation on small or compact automobiles.

These and other improvements in luggage racks are provided by a device having a horizontal tray attached to the rear of the automobile using the license plate bracket and the bumper or a bumper attachment and having a vertical or inclined support member extending upward along the rear deck of the automobile from the front edge of the tray. The tray and support member are both easily and quickly attached to and removed from the automobile and chains extend between the support member and the tray to provide additional strength to the luggage rack. Straps are provided for maintaining items in position on the luggage rack and the luggage rack is easily folded for storage when not mounted on an automobile.

These and other features and advantages of the invention will be more clearly understood from the following detailed description and the accompanying drawings in which like characters of reference designate corresponding parts in all figures and in which:

FIG. 1 is a perspective view of the luggage rack of the invention installed on a small or compact automobile.

FIG. 2 is a side elevational view of the luggage rack shown in FIG. 1 with the rear deck of the automobile shown in section.

FIG. 3 is a perspective view of a modified form of clamp for attaching the luggage rack to the rear deck of an automobile.

FIG. 4 is a perspective view of another modified form of clamp for attaching the luggage rack to the rear deck of an automobile.

FIG. 5 is a perspective view of the luggage rack folded as for storage.

These drawings and the following detailed description disclose a preferred specific embodiment of the invention but the invention is not limited to the details disclosed since it may be embodied in other equivalent forms.

In the specific embodiment of the invention shown in FIG. 1 and FIG. 2, the luggage rack, generally indicated by the letter R, is mounted on a small or compact automobile 10 having a sloping rear deck 11 and a grill 16 of known type in its rear deck 11 to provide ventilation in known manner to an engine (not shown) mounted in the rear of the automobile 10. A bumper 12 extends across the rear of the automobile 10 and vertical members 14 support a bumper rod 13 extending above and parallel to the bumper 12. An automobile 10 having these characteristics is well suited to the use of the luggage rack of the invention. However, it will be understood from the description of the luggage rack R to follow that the luggage rack R is equally well suited to use on automobiles having other characteristics.

The luggage rack R comprises a horizontal tray 20 and a vertical support member 25. When mounted on the automobile 10, the tray 20 extends rearward from the rear deck 11 of the automobile 10 and the vertical support member 25 extends forwardly and upwardly along the rear deck 11 of the automobile 10. The tray 20 is fixedly positioned adjacent to the rear deck 11 of the automobile 10 by brackets 21 which engage the bumper rod 13 and by a flange 26 which is attached to the license plate bracket 18 mounted on the rear deck 11 of the automobile 10. The support member 25 is pivotally attached at its lower end to the tray 20 and is attached at its upper end by utilizing the grill 16 in the rear deck 11 of the automobile 10.

The tray 20 has a horizontal bottom plate 22 and side walls 17 and 23, a front wall 27, and a rear wall 33 extending upward from the edges of the bottom plate 22. The walls 17, 23, 27 and 33 form a continuous lip around the periphery of the bottom plate 22 and serve to retain items on the bottom plate 22 of the tray 20.

The brackets 21 are partial cylinders and each bracket 21 is attached to bottom plate 22 by welding or other known means so that its sides extend downward to form an open channel shaped to rest upon and engage the bumper rod 13. The flange 26 has a mounting portion 28 and the flange 26 is attached to the tray 20 by attaching the mounting portion 28 to the bottom plate 22 using rivets, welding or other known means. The flange 26 has holes 63 positioned to register with the holes or slots (not shown) in the license plate bracket 18 when the flange 26 is placed adjacent to the license plate bracket 18.

The brackets 21 and the mounting portion 28 of the flange 26 are attached to the bottom plate 22 in those positions which cause the brackets 21 to engage the bumper rod 13 and the flange 26 to be adjacent to the license plate bracket 18 when the tray 20 is horizontal and extending rearward from the rear deck 11 of the automobile 10. When bolts 37, secured in known manner by nuts 38, are inserted through the holes 63 of the flange 26 and the holes or slots (not shown) in the license plate bracket 18, the flange 26 and brackets 21 serve to fixedly position the tray 20 relative to the rear deck 11 of the automobile 10.

A pair of threaded studs 29 extend from the rear wall 33 of the tray 20. The studs 29 are positioned for insertion into the slots 47 of a license plate 30 of known type and the studs 29 provide means for mounting the license plate 30 when the license plate bracket 18 is used for mounting the tray 20 in the above described manner.

The support member 25 is an inverted U defined by side members 31 and 32 joined by an upper member 34. Transverse members 35 are attached to and extend between the side members 31 and 32. The lower end of the side member 31 is pivotally attached to the side wall 17 adjacent to the rear wall 27 by extending a bolt 43 through the side member 31 and the side wall 17 and the side member 32 is pivotally attached to the side wall 23 adjacent to the rear wall 27 by extending a bolt 44 through the side member 32 and the side wall 23. This arrangement permits the support member 25 to pivot with respect to the tray 20 about the bolts 43 and 44. When the luggage rack R is positioned on an automobile 10, the support member 25 is pivoted into that position which places it substantially parallel to the rear deck 11 of the automobile 10. The support member 25 is maintained in this position substantially parallel to the rear deck 11 of the automobile 10 by clamps 40 which attach the side members 31 and 32 to the grill 16 in the rear deck 11 of the automobile 10.

A chain 39 extends between the side wall 17 of the tray 20 and the middle portion of the side member 31 of the vertical member 25 and a chain 40 extends between the side wall 23 of the tray 20 and the middle portion of the side member 32 of the vertical member 25. The chains 39 and 40 are attached to the side walls 17 and 23 at points more remote from the rear deck 11 of an automobile 10 than the brackets 21 and when the vertical member 25 is attached to the rear deck 11 of an automobile 10, the chains 39 and 40 provide support to that portion of the tray 20 extending from the rear deck 11 beyond the brackets 21 and the bumper rod 13.

A strap 50 has one end fixedly attached to the side member 31 above the chain 39 and a strap 51 has one end fixedly attached to the side member 32 above the chain 40. The extending end of the strap 50 carries a buckle 52 and the extending end of the strap 51 has holes 53 which cooperate with the buckle 52 in known manner to permit the extending ends of the straps 50 and 51 to be joined around items positioned on the tray 20.

One embodiment of the clamps 40 by which the support member 25 is attached to the grill 16 of the automobile 10 is clearly shown in FIG. 2. A second embodiment of the clamps 40′ is shown in FIG. 3 and a third embodiment of the clamps 40″ is shown in FIG. 4. These three embodiments of the clamps 40, 40′, and 40″ are particularly suited to use of the support rack R with an automobile having a grill 16 in its rear deck 11. However, it will be understood from the description of the clamps 40, 40′ and 40″ to follow that they are readily adaptable to an automobile not having a grill 16.

Each clamp 40 comprises a hook 60 attached to a side member 31 or 32 and a ring 61 fixedly positioned adjacent to the grill 16 in a position to be engaged by the hook 60 when the support member 25 is positioned parallel to the rear deck 11. There is a hook 60 attached to each side member 31 and 32 and a ring 61 for each hook 60.

Each hook 60 is attached to a side member 31 or 32 by attaching its shank 63 to eye 64 carried by a sleeve 65 on the side member 31 or 32 and each hook 60 has a flexible keeper 66 which operates in known manner to permit the insertion and removal of a ring 61.

Each ring 61 is positioned adjacent to the grill 16 by forming the ring 61 at the end of a shaft 67 which is fixedly inserted through an outer plate 68 between the ring 61 and the grill 16 and an inner plate 69 on the opposite side of the grill 16 from the outer plate 68.

Each shaft 67 extends through one of the slits 70 which form the grill 16 and the positioning of the rings 61 does not require altering the automobile 10. When a clamp 40 is installed on an automobile (not shown) not having a grill 16, it is simply necessary to drill a small hole (not shown) in the rear deck 11 for the shaft 67.

Each clamp 40′ has a shaft 67′ inserted through an outer plate 68 and an inner plate 69 in the same manner as the shaft 67 of a clamp 40. Locking nuts 110 and 111 maintain the positions of the plates 68 and 69 on opposite sides of the rear deck 11 and of the shaft 67. Similar to the shaft 67, the shaft 67′ is inserted through a slit 70 in the grill 16 or may be inserted through a hole (not shown) in the rear deck 11. However, unlike the shaft 67, the shaft 67′ of each clamp 40′ is continuous with a clamping member 80. Each clamping member 80 has a partial cylinder 81 shaped to engage a side member 31 and 32.

Extending from each clamping member 80 is a threaded bolt 83. A keeper member 84 is rotatably mounted on each threaded bolt 83. Each keeper member 84 is rotatable into a locking position over a partial cylinder 81 and when in this locking position, the keeper member 84 will firmly hold a side member 31 or 32 between itself and the partial cylinder 81. The keeper member 84 is maintained in this position by a wing nut 86. Each clamping member 80 is flexible between the shaft 67′ and the partial cylinder 81 to permit the deflection of the clamping member 80 and the easy insertion of a side member 31 or 32 into the partial cylinder 81 when the keeper member 84 is not in locking position.

Each clamp 40″ has a shaft 67″ positioned in a slit 70 of the grill 16 by a loop 90 formed at its inserted end and by an outer pad 91 engaging the rear deck 11 of the automobile 10. The shaft 67″ extends through the outer pad 91 and is threaded adjacent to the outer pad 91 and the outer pad 91 is maintained in position against the rear deck 11 and with the tip 99 of the loop 90 engaging it by a lock nut 92 whch threadably engages the shaft 67″.

The shaft 67″ is also threaded at its extending end and an adjusting nut 93 threadably engages this end of the shaft 67″. Adjacent to the adjusting nut 93 on the shaft 67″ is a spring washer 94 and adjacent to the spring washer 94 on the shaft 67″ is a spring 95. The spring 95 is between the spring washer 94 and the mounting plate 96 of a clamping member 97.

The spring 95 urges the spring washer 94 and mounting plate 96 apart and as a result the mounting plate 96 is urged toward the rear deck 11. The mounting plate 96 is freely rotatable about the shaft 67″ and is continuous with a hook member 98 shaped to receive one side of a slide member 31 or 32. This arrangement permits the hook member 98 to be rotated and moved away from the rear deck 11 against the spring 95 pressure to engage and disengage a side member 31 or 32.

When the hook member 98 is engaging a side member 31 or 32, the pressure of the spring 95 urging the hook member 98 toward the rear deck 11 insures that the side member 31 or 32 is firmly held. The amount of spring 95 pressure can be varied by rotating the adjusting nut 93 so as to vary the distance of the adjusting nut 93 from the rear deck 11 and the compression of the spring 95 by a side member 31 or 32.

The clamps 40, 40′, and 40″ permit the luggage rack R to be quickly and conveniently mounted on an automobile 10 and where the automobile 10 has a grill 16 in its rear deck 11, the luggage rack R is mounted without any permanent alteration of the automobile 10. This is because the shafts 67, 67' or 67" are simply inserted through the slits 70 of the grill 16. If the automobile 10 has no grill 16, the only permanent alteration required for the mounting of the luggage rack R is the drilling of holes (not shown) in the rear deck 11 for the shafts 67, 67' and 67".

Once the shafts 67, 67', or 67" are fixedly positioned in the slits 70 of the grill 16 or in holes (not shown) in the rear deck 11, the luggage rack R is mounted by simply placing the brackets 21 on the bumper rod 13, bolting the flange 26 to the license plate bracket 18, and attaching the support member 25 to the rear deck 11 with clamps 40, 40' or 40". The luggage rack R is removed by simple releasing the supporting member 25 from the clamps 40, 40', or 40", releasing the flange 26 from the license plate bracket 18, and disengaging the brackets 21 from the bumper rod 13.

When used with automobiles (not shown) not having a bumper rod 13, the luggage rack R is installed with the brackets 21 engaging the bumper 12 or other bumper attachment and when the automobile has no license plate bracket 18 mounted on its rear deck 11, a bracket (not shown) similar to the license plate bracket 18 is mounted on the rear deck 11. This alteration of an automobile (not shown) simply requires the drilling of several holes and even when slight alterations in the automobile (not shown) are necessary to use the luggage rack R, the luggage rack R can be mounted and removed quickly and conveniently.

When mounted on an automobile 10, the luggage rack R is attractive and has the appearance of a permanently installed luggage rack. The items to be carried (not shown) are positioned on the tray 20 and the straps 50 and 51 art tightened around the items in known manner to hold the items firmly in position on the tray 20 and against the support member 25. It will be understood that the luggage rack R is particularly suited to long, clumsy items such as golf carts and golf bags which are easily carried by placing them upright on the tray 20 and strapping them against the support member 25.

When the items carried are relatively tall such as golf carts and golf bags and the rear deck 11 of the automobile 10 is inclined forward as shown in FIG. 1, the inclined position of the support member 25 when it is positioned substantially parallel to the rear deck 11 tends to place the weight of the items being carried over the rear wheels 100 of the automobile 10. This prevents the weight of the luggage being carried from adversely affecting the handling and riding properties of the automobile.

FIGURE 5 shows the luggage rack R removed from the automobile 10 and folded as for storage. The support member 25 is rotated about the bolts 43 and 44 into a position substantially parallel to the tray 20 and with the support member 25 in this position relative to the tray 20, the luggage rack R can be conveniently stored when not in use.

It will be obvious that many variations may be made in the embodiment here chosen for the purpose of illustrating the present invention without departing from the scope thereof as defined by the appended claim.

What is claimed as invention is:

A luggage rack for an automobile having a rear deck, a bumper member, a grill in said rear deck, and a support bracket mounted on said rear deck below said grill, said luggage rack comprising a horizontal tray extending from said rear deck over said bumper member; a plurality of brackets attached to said tray and engaging said bumper member; a wall extending upward from the edges of said tray; a flange extending between said tray and said support bracket to prevent tilting of said tray in one direction; a support member having a substantially U-shape and having a pair of side members pivotally attached to said wall, said support member being disposed substantially parallel to said rear deck of said automobile; a pair of chains, one of said chains being attached to each of said side members and to said wall to prevent tilting of said tray in the opposite direction; a strap extending between said side members; a pair of inner plates positioned on the opposite side of said grill from said support member; a pair of outer plates positioned adjacent to said grill between said support member and said grill; a pair of shafts with one shaft fixedly extending through each of said outer plates, the said grill, and one of said inner plates; a pair of rings with one ring attached to each of said shafts between the said support member and the grill; a pair of sleeves with one sleeve on each of said side members; and a pair of hooks with one hook mounted on each sleeve and engaging one of said rings.

References Cited by the Examiner

UNITED STATES PATENTS

| 1,804,377 | 5/31 | Freysinger | 24—236 |
| 2,033,766 | 3/36 | Hall | 24—236 |
| 2,439,430 | 4/48 | Hurd | 24—263 |
| 2,516,713 | 7/50 | McClure | 24—263.3 |
| 2,541,244 | 2/51 | Hack | 224—42.07 |
| 2,566,656 | 9/51 | David | 24—263 |

FOREIGN PATENTS

| 159,099 | 6/57 | Sweden. |
| 351,851 | 3/61 | Switzerland. |

GERALD M. FORLENZA, *Primary Examiner.*

HUGO O. SCHULZ, *Examiner.*